United States Patent [19]

Iwakami

[11] 3,753,161

[45] Aug. 14, 1973

[54] TWO-PORT NETWORK FOR SIGNAL TRANSMISSION CIRCUIT

[75] Inventor: Takuya Iwakami, Tokyo, Japan

[73] Assignee: Nippon Electric Company Limited, Tokyo, Japan

[22] Filed: May 4, 1971

[21] Appl. No.: 140,228

[30] Foreign Application Priority Data

May 15, 1970 Japan .............................. 45/41447

[52] U.S. Cl. ................ 333/23, 333/70 CR, 333/22

[51] Int. Cl. ........................................ H04b 3/40

[58] Field of Search ............ 333/73, 75, 70, 70 CR, 333/22, 23; 330/38, 39

[56] References Cited

UNITED STATES PATENTS

| | | | |
|---|---|---|---|
| 2,126,915 | 8/1938 | Norton | 333/23 |
| 3,602,770 | 8/1971 | McMahon | 333/70 CR |
| 3,603,900 | 9/1971 | Hatorl et al. | 333/75 |
| 3,022,472 | 2/1962 | Tannenbaum | 333/18 |
| 3,566,284 | 2/1971 | Thelen | 328/155 |
| 3,148,344 | 9/1964 | Kaufman | 333/18 |
| 3,195,077 | 7/1965 | Barditch et al. | 333/70 |

*Primary Examiner*—Rudolph V. Rolinec
*Assistant Examiner*—Saxfield Chatmon, Jr.
*Attorney*—Sughrue, Rothwell, Mion, Zinn & Macpeak

[57] ABSTRACT

A dummy transmission line having an attenuation characteristic proportional to $\sqrt{f}$ over the frequency band of interest is constructed from two uniformly distributed RC networks. The characteristic impedances of both networks are identical and the length of the second network is determined by the lowest frequency of interest in using the networks.

4 Claims, 5 Drawing Figures

Figure 1A:
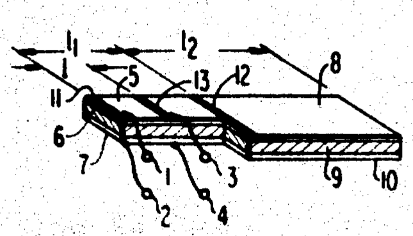

INVENTOR
TAKUYA IWAKAMI

BY Sughrue, Rothwell, Mion, Zinn & Macpeak
ATTORNEYS

TWO-PORT NETWORK FOR SIGNAL TRANSMISSION CIRCUIT

This invention relates to two-port networks for use as dummy transmission lines at repeaters in a coaxial-cable-type transmission system.

A two-port transmission network with the so-called $\sqrt{f}$ attenuation characteristic, i.e. the attenuation in decibels proportional to the square root of the frequency, is especially important in a transmission system conprising coaxial cable and repeaters. More specifically, in this type of transmission system, it is usually a problem that the spatial interval between every two adjacent repeater stations slightly vary from one place to another depending especially on the physical conditions encountered at the time of installing the cables. To compensate for the variations and to substantially equalize the repeater intervals several kinds of two-port networks, which have the $\sqrt{f}$ attenuation characteristic identical to the coaxial cable and different lengths, are employed as dummy transmission line in appropriate combination with the coaxial cables. A conventional two-port network employed for this purpose is the constant resistance type attenuation equalizer comprising passive elements (resistance, capacitance, inductance) of concentrated constants. A two-port network of the constant-resistance attenuation equalizer type has several technical advantages, e.g. the driving-point impedance is a purely resistive constant value independent of the frequency, and construction is simple. On the other hand, there are disadvantages: (1) miniaturization by application of integrating circuit technique is hard since it uses lumped constant elements; (2) a proximity band with respect to the $\sqrt{f}$ attenuation characteristic is limited to 2–3 decades at best; (3) a proximity deviation is unavoidable in the proximity band, which causes waveform distortion; and (4) an effective approximating method is not developed yet and so it is hard to design the synthesized network accurately and, moreover, the design of such network must be modified depending on the length of the line to be approximated.

An object of the present invention is therefore to provide a two-port network having the $\sqrt{f}$ attenuation characteristic which is free of any of the disadvantages of the conventional device. According to the present invention, there is provided a two-port network which shows an accurate $\sqrt{f}$ attenuation characteristic over a wide frequency range. Since the network of the present invention is composed only of a distributed RC network, the integrated circuit technique is easily applicable for miniaturization.

Figure 2A:
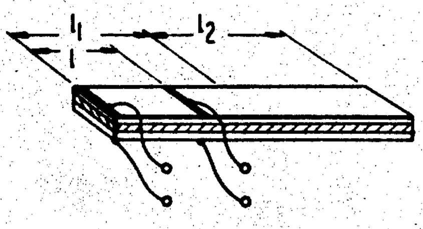
Figure 3:
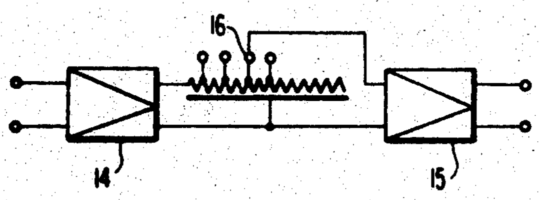

The invention will now be described referring to the drawings, wherein:

FIGS. 1A and B show an embodiment of the present invention and its equivalent circuit, respectively;

FIGS. 2A and B show another embodiment of the present invention and its equivalent circuit, respectively; and FIG. 3 shows an application of the present invention to a dummy network.

In FIG. 1A, the left-hand side of a uniformly distributed RC network is composed of a resistance body 5, a dielectric substance 6 and a conductor 7, while the right-hand side is of a resistance body 8, a dielectric substance 9 and a conductor 10. Numerals 11, 12 and 13 denote conductors provided perpendicular to the lengthwise direction of the distributed resistance element, so that the current distribution may be uniform at the input and output points of the signal and at the connection point of the left-hand and right-hand side RC network. Terminals 1 and 2 constitute the input port. Each of the terminals is connected to the conductors 11 and 7, respectively. On the other hand, terminals 3 and 4 constitute the output port, each of which terminals is connected to the conductors 13 and 7. Assuming that $R_1$ and $C_1$ signify resistance and capacitance per unit length of the left-hand side of the distributed RC line, $l_1$ is the length thereof, $l(\leqq l_1)$ is the distance between the conductors 11 and 13, and further that $R_2$ and $C_2$ signify the resistance and capacitance per unit length of the right-hand side distributed RC line, and $l_2$ is the length thereof, constants of both sides are so selected that the characteristic impedance of left-hand and right-hand sides coincides iwth each other. More specifically, the expression $$R_2/C_2 = R_1/C_1 \tag{1}$$

holds. In this case, the characteristic impedance $Z_o$ of the left-hand side is:

$$Z_o = \sqrt{R_1/C_1} \cdot (1/\sqrt{S}) \tag{2}$$

where $S$ is the complex angular frequency. Next, the driving-point impedance $Z_{in}$ of the right-hand side of the distributed RC network is:

$$Z_{in} = \sqrt{R_2/C_2} \cdot 1/\sqrt{S} \tanh \sqrt{R_2C_2S}\, l_2 \tag{3}$$

Now, if the length $l_2$ is determined to satisfy the equation:

$$l_2^2 \geqq 10/2\pi f_c R_2 C_2 \tag{4}$$

(where $f_c$ is a lower limit frequency of the used frequency band width) then, as described in a paper entitled "Synthesis of RC transmission networks containing distributed RC network" by Suezaki, Takahashi and Iwagami (Electronics and Communications in Japan, Vol. 51-A, No. 9, 1969, pp. 9 – 18), $$Z_{in} \approx \sqrt{R_2/C_2} \cdot 1/\sqrt{S} = Z_o \tag{5}$$

for any frequency above $f_c$. The error in the equation 5 is maximum at $f = f_c$ when S is equal to $j2\pi f$ (where $f$ is the frequency, $j^2 = -1$). In this case, the errors of the amplitude and phase are nearly equal to 1 percent, and the error decreases rapidly with the increase in $f$. In FIGS. 1A and B, the end point of the left-hand side of the distributed RC network is in an opened state, but it may also be in short-circuited state. In this case, $$Z_{in} = \sqrt{R_2/C_2} \cdot 1/\sqrt{S} \coth \sqrt{R_2C_2}\, Sl_2 \tag{6}$$

and thus the equation 5 is likewise satisfied under the condition of equation 4. As stated above, by determining the constants $R_2$, $C_2$ and $l_2$ of the distributed RC network to satisfy equations 1 and 4, the impedance, viewing from the terminal pair 3 and 4 (FIG. 1) toward the right-hand side can be regarded equal to $Z_0$ for all the frequency above $f_c$. Accordingly, the voltage transfer function T(S) of the two-port circuit, with 1 and 2 as the input port 3 and 4 as the output port can be expressed as $$T(S) = \cosh \{ \sqrt{R_1C_1}\, l \sqrt{S} \} + \sinh \{ \sqrt{R_1C_1}\, l \sqrt{S} \} = \exp \{ \sqrt{R_1C_1}\, l \sqrt{S} \} \quad (7)$$

The amplitude characteristic (attenuation characteristic) of the equation 7 is when it is expressed in decibel, the so-called $\sqrt{f}$ characteristic, or proportional to the square root of the frequency. By changing the values of $R_1$, $C_1$, or $l (\leqq l_1)$, it is possible to arbitrarily change the proportional factor of $\sqrt{f}$. The numerical examples are as follows: Attenuation in equation 7 is 4.9 dB at 100 MHz for $R = 10\ \Omega$/mm, $C_1 = 1$PF/mm, $l = 10$ mm, and this corresponds to about 210 m of 0.375 inch coaxial cable. If $R_2 = 100\ \Omega$/mm and $C_2 = 10$ PF/mm, it is necessary that $l_2 = 12.6$ mm to obtain $f_c = 1$ MHz.

Figure 1B:
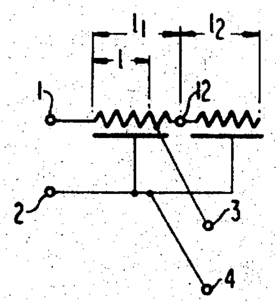
Figure 2B:
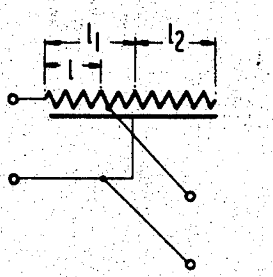

Now referring to FIGS. 2A and 2B, the left-hand and right-hand sides of the distributed constant RC network are formed of a common materials. Consequently, there is no structural difference between these two sides. So, it is much simpler in construction than that of FIG. 1. In this case, however, since $R_2$ is made equal to $R_1$ and $C_2$ to $C_1$ so as to obtain the same $f_c (= 1$ MHz) as the example of the numerical value shown above, for example, it is required to put $L_2 \geqq 126$ mm.

In the embodiment of FIGS. 1 and 2, it is necessary to give some conditions to the input and output circuits connected to the input- and output-ports of the two-port network. Since the value of the characteristic impedance $Z_0$ of the network, as shown in Equation 5, varies in response to the frequency change, the inner impedance of the input circuit (a signal source) should be sufficiently low, and the input impedance of the output circuit should be sufficiently high, in comparison with $Z_0$ in the range of the used bandwidth. In FIG. 3, the numerals 14 and 15 denote buffer amplifiers. The output impedance of the amplifier 14 is sufficiently low as compared with the characteristic impedance $Z_0$, and the input impedance of the amplifier 15 is taken suffuciently high as compared with $Z_0$. The connection between the buffer amplifiers 14 and 15 is effected by selectively linking an appropriate tapping point 16 with the amplifier 15 so as to achieve the necessary $\sqrt{f}$ attenuation characteristic. The circuit of FIG. 3 can be formed as a whole in an integrated circuit including the amplifiers, and it can also be constituted in compact for as dummy transmission line.

It will be apparent to one skilled in the art that when the characteristic impedance of the coaxial cable connected to the input side of the two-port network is comparatively low as compared with $Z_0$, the buffer amplifier 14 of input side can be substituted by a termination resistor with a constant value equal to the characteristic impedance of the coaxial cable.

The advantages of the two-port network of the present invention will be summarized as follows:

1. Since the network of the present invention is composed only of distributed RC networks of the simple grounded configuration, the integrated circuit techniques are easily applicable making it possible to miniaturize the network as a while;

2. There is no upper limit of the effective frequency band for the approximation to the $\sqrt{f}$ attenuation characteristic, and the lower limit $f_c$ can be lowered arbitrarily by selecting the values of $R_2$ and $C_2$ appropriately;

3. There is no substantially deviation in approximation for the $\sqrt{f}$ characteristic in the frequency band above $f_c$. This is due to the fact that the approximation deviation is virtually negligible when the relationship of the equation 4 is satisfied, because it is attributed only to impedance mismatching caused by the simulation of $Z_{in}$ by the equation 5;

4. The network of this invention can be easily formed without resorting to complicated approximation approach. Also, the $\sqrt{f}$ attenuation characteristic of the coaxial cables of various lengths is arbitrarily obtained only by properly selecting the tapping point in the arrangement of FIG. 3.

Furthermore, when the approximation deviation for $\sqrt{f}$ characteristic is permitted to the extent that no inconvenience is caused, the length $l_2$ need not necessarily satisfy the equation 4 strictly. How far the deviation for the $\sqrt{f}$ characteristic, can be tolerated or how far the length $l_2$ can be shortened (or, if $l_2$ can not varied, how far the frequency $f_c$ can be lowered) depend on the circumstances, where the repeatered system is installed.

What is claimed is:

1. A two-port transmission network for operation over a band of frequencies, comprising, a. a first uniformly distributed RC network having a resistance per unit length $R_1$ and a capacitance per unit length $C_1$, b. a second uniformly distributed RC network having a resistance per unit length $R_2$ and a capacitance per unit length $C_2$, where $R_2/C_2 = R_1/C_1$ resulting in the characteristic impedances of said first and second networks being equal, said second network having a length $L_2$ greater than $$\sqrt{10/2\ \pi\ f_c\ R_2\ C_2}, \text{ where}$$

$R_2$ and $C_2$ are as defined above and $f_c$ is the lowest frequency of said frequency band, said second network having one end thereof connected to one end of said first network, c. an input terminal provided at another end of said first network, and d. an output terminal provided at a portion on said first RC network other than said another end, whereby a voltage characteristic of the network observed between said input terminal and output terminal, when expressed by decibels, is set to be proportional to the square root of the frequency of a signal applied to said input terminal.

2. A two-port transmission network as claimed in claim 1 wherein each of said first and second networks comprises a layer of conductive material, a layer of resistive material, and layer of dielectric material sandwiched between said layers of conductive and resistive layers.

3. A two-port transmission network as claimed in claim 1 wherein the resistance and capacitance per unit length of said first network are equal to the resistance and capacitance per unit length of said second network.

4. A dummy transmission line for operation over a band of frequencies comprising:

a. a first uniformly distributed RC network having a resistance per unit length $R_1$ and a capacitance per unit length $C_1$, b. a second uniformly distributed RC network having a resistance per unit length $R_2$ and a capacitance per unit length $C_2$, where $R_2/C_2 = R_1/C_1$ resulting in the characteristic impedances of said first and second networks being equal, said second network having a length $L_2$ greater than $$\sqrt{10/2 \pi f_c R_2 C_2}, \text{ where}$$

$R_2$ and $C_2$ are as defined above and $f_c$ is the lowest frequency of said frequency band, said second network having one end thereof connected to one end of said first network, c. an input terminal provided at another end of said first network, d. an output terminal provided at a portion on said first RC network other than said another end, whereby a voltage characteristic of the network observed between said input terminal and output terminal, when expressed by decibels, is set to be proportional to the square root of the frequency of a signal applied to said input terminal, and e. a low output impedance buffer amplifier connected to said input terminal and a high input impedance buffer amplifier connected to said output terminal, whereby the input signal of said transmission line is applied to the input of said low output impedance buffer amplifier and the output signal of said transmission line is delivered from the output of said high input impedance buffer amplifier.

* * * * *

UNITED STATES PATENT OFFICE
CERTIFICATE OF CORRECTION

Patent No. 3,753,161 Dated August 14, 1973

Inventor(s) TAKUYA IWAKAMI

It is certified that error appears in the above-identified patent and that said Letters Patent are hereby corrected as shown below:

Column 1

Line 11, delete "this type of" and insert --such a--

Column 2

Line 62, delete " $\sqrt{R_2 C_2}$ $Sl_2$ " and insert --$\sqrt{R_2 C_2 S}$ $l_2$ Column 3

Line 14, after "is" insert --,--

Line 20, delete "R" and insert --$R_1$--

Line 33, delete "$L_2$" and insert --$l_2$--

Column 4

Line 2, delete "while" and insert --whole--

Signed and sealed this 4th day of May 1974.

(SEAL)
Attest:

EDWARD M. FLETCHER, JR.
Attesting Office

C. MARSHALL DANN
Commissioner of Patents

ORM PO-1050 (10-69)

USCOMM-DC 60376-P69
☆ U.S. GOVERNMENT PRINTING OFFICE : 1969 O—366-334.